United States Patent [19]
Stark

[11] Patent Number: 5,961,261
[45] Date of Patent: Oct. 5, 1999

[54] CLAMPING CYLINDER FOR PULLING IN A PULL-IN NIPPLE, A RESPECTIVE PULL-IN NIPPLE AND A CLAMP SYSTEM, FOR USE WITH FLYING CHIPS

[76] Inventor: Emil Stark, Kommingerstrasse 48, A-6840 Gotzis, Austria

[21] Appl. No.: 08/925,956

[22] Filed: Sep. 9, 1997

[30] Foreign Application Priority Data

Sep. 9, 1996 [DE] Germany ............................ 196 36 375

[51] Int. Cl.[6] ......................................................... B23D 7/08
[52] U.S. Cl. ............................................ 409/219; 269/309
[58] Field of Search ..................................... 409/219, 225, 409/232, 233, 234; 279/4.12, 121; 269/309; 82/162

[56] References Cited

U.S. PATENT DOCUMENTS

| | | | |
|---|---|---|---|
| 3,918,352 | 11/1975 | Reich et al. ............................ | 279/4.12 |
| 4,209,180 | 6/1980 | Bertorello ................................ | 279/4.12 |
| 4,577,847 | 3/1986 | Schedwin . | |
| 4,932,642 | 6/1990 | Salenbien et al. ...................... | 269/309 |
| 4,934,680 | 6/1990 | Schneider ................................ | 269/309 |
| 5,036,579 | 8/1991 | Buchler .................................... | 269/309 |
| 5,065,991 | 11/1991 | Schneider ................................ | 269/309 |
| 5,246,217 | 9/1993 | Brot ......................................... | 269/309 |
| 5,370,378 | 12/1994 | Weber et al. ............................ | 269/309 |
| 5,415,384 | 5/1995 | Obrist et al. ............................. | 269/309 |

FOREIGN PATENT DOCUMENTS

| | | |
|---|---|---|
| 0 282 417 A1 | 9/1988 | European Pat. Off. . |
| 0 291 482 A1 | 11/1988 | European Pat. Off. . |
| 41 35 418 A1 | 5/1993 | Germany . |
| 43 07 342 A1 | 9/1994 | Germany . |
| 43 39 271 C1 | 6/1995 | Germany . |
| 43 41 743 A1 | 6/1995 | Germany . |
| 44 28 310 A1 | 2/1996 | Germany . |

*Primary Examiner*—Andrea L. Pitts
*Assistant Examiner*—Adesh Bhargava

[57] ABSTRACT

The present invention relates to a clamping cylinder for pulling-in and clamping a pull-in nipple as well as to the nipple itself and to a clamping system comprising a clamping cylinder and a pull-in nipple. The nipple may repeatedly be pulled in the clamping cylinder in an exactly reproduceable position. The clamping cylinder is provided with a central bore extending through the clamping cylinder and adapted to receive the nipple, pull it in and lock it. The cylinder is provided with cleansing means to dispense a cleaning fluid, while the nipple is provided with at least one cutting member.

16 Claims, 6 Drawing Sheets

FIG 13

CLAMPING CYLINDER FOR PULLING IN A PULL-IN NIPPLE, A RESPECTIVE PULL-IN NIPPLE AND A CLAMP SYSTEM, FOR USE WITH FLYING CHIPS

BACKGROUND OF THE INVENTION

The present invention relates in general to a clamping cylinder for pulling-in and clamping a pull-in nipple as well as to the nipple itself and to a clamping system comprising a clamping cylinder and a pull-in nipple. The nipple may repeatedly be pulled in the clamping cylinder in an exactly reproduceable position. All parts are designed to be used in adverse environments during cutting procedures so that chips are freely flying around and are likely to cover vital parts of the clamping system.

PRIOR ART

A similar clamping system is disclosed in German Patent Application DE 41 35 418 assigned to the same applicant.

The nipple is pulled in the cylinder and centers itself using appropriate centering surfaces. The longitudinal axis of the nipple is then in exact arrangement with the longitudinal axis of the cylinder. The nipple is further provided with axial abutment surfaces so that it can only be pulled in to a certain extent. Accordingly, the nipple is positioned in exact relationship with respect to the cylinder which in turn is arranged e.g. on the table of a cutting machine such as a milling machine or a lathe.

The nipple itself is attached to a pallet or a workpiece. To ensure proper positioning, the nipple is provided with additional abutment surfaces. Accordingly, the pallet or the workpiece is in exact orientation with respect to the nipple, while the nipple itself is in exact orientation with respect to the clamping cylinder which in turn is fixed to the machine.

This system offers significant advantages over other prior art devices. As the pallet is via the nipple always in exact geometric relationship with respect to the machine, the pallet can be equipped with one or several workpieces whose orientation with respect to the machine is already known prior to actually attaching the pallet. It is no longer required to stop the machine to arrange the workpieces. The system allows for a speedy way to change the workpieces by simply exchanging the pallets.

However, the system as set forth in DE 41 35 418 suffered from the disadvantage that all contact points between the nipple and the cylinder had to be as clean as possible. It is evident that frequent cleaning had to be performed. During each cleaning process, the machine had to be stopped, leading to unnecessary costs.

SUMMARY OF THE INVENTION

Accordingly, it is an object of the present invention to provide a clamping cylinder, a nipple and a clamping system capable to work for extended periods of time without requiring cleaning.

It is a further object of the invention to provide a system as set forth above which is capable to operate properly in spite of chips covering at least a part of the cylinder and/or other pieces of the clamping system.

It is a still further object of the invention to provide a system as set forth above which is capable to perform a self-cleaning without manual help.

These and other objects are fulfilled by providing a clamping cylinder being provided with a central bore extending through the complete cylinder. Any dirt or chips falling upon the cylinder may easily be removed through that central bore. To ensure removal, the cylinder may be equipped with a cleaning means providing a flow of cleaning fluid, either air, oil or cooling and cutting fluid, passing over a portion of the cylinder to remove any dirt or chips.

The nipple is received in the same central bore. In order to pull him in said bore, the cylinder is provided with several locking pistons capable to engage the nipple and to pull him inside the central bore to an end position. Said locking pistons are preferably actuated by a hydraulic fluid. To ensure a proper pull-in and locking action, the locking pistons may be provided with a cutting edge. Any chip sticking to the nipple or the pistons will be cut and rmoved.

For reasons of safety, the pull-in and locking action is governed by springs, while a release is obtained by a hydraulic fluid. Should the pressure source for the hydraulic fluid be disconnected during operation, the springs will keep the nipple securely in the locked position.

The nipple itself is provided with centering surfaces to ensure proper positioning inside the central bore of the cylinder. Additionally, it is provided with at least one cutting means, in the form of a cutting surface or a cutting edge. Should any chips stick to nipple or to the centering surfaces of the cylinder, these chips are cut and removed. The cutting means on the nipple may be extending radially and comprising several independent cutting edges, or may be extending circumferentially.

To ensure proper positioning of the nipple on the pallet or the workpiece, it is provide with a cylindrical lug which is adapted to be received in a bore in the pallet or workpiece. The nipple is then preferably fixed by means of a screw extending through a central bore in the nipple and inside a thread formed in the pallet or workpiece. Of course, any other suitable connection between the nipple and the pallet or workpiece may be used.

On its other end, the nipple is provided with a separate plate. This plate serves two purposes. First, the screw head is embedded in said plate. Any radial forces due to fastening the screw will not directly act on the nipple, spreading it up. Second, the plate is made of softer material than the cylinder. In case the nipple is not inserted properly in the central bore, the plate which can be easily replaced will be damaged, while the cylinder remains unharmed.

In another embodiment, the nipple is attached to the pallet or workpiece by means of several screws distributed along a circumferential line. This mode of attachment is preferred is the nipple is provided with a rather huge diameter flange.

To further enhance security and operation, the pallet may additionally be provided with a cutting means, mounted separately from the nipple.

Preferably, the associated contact surface on the upper surface of the cylinder which is constantly touched by the cutting means is provided on a separate part which may easily be replaced.

BRIEF DESCRIPTION OF THE DRAWINGS

Further features of the present invention will now be described in connection with the attached drawings, in which.

DESCRIPTION OF THE CLAMPING

Figure 1:
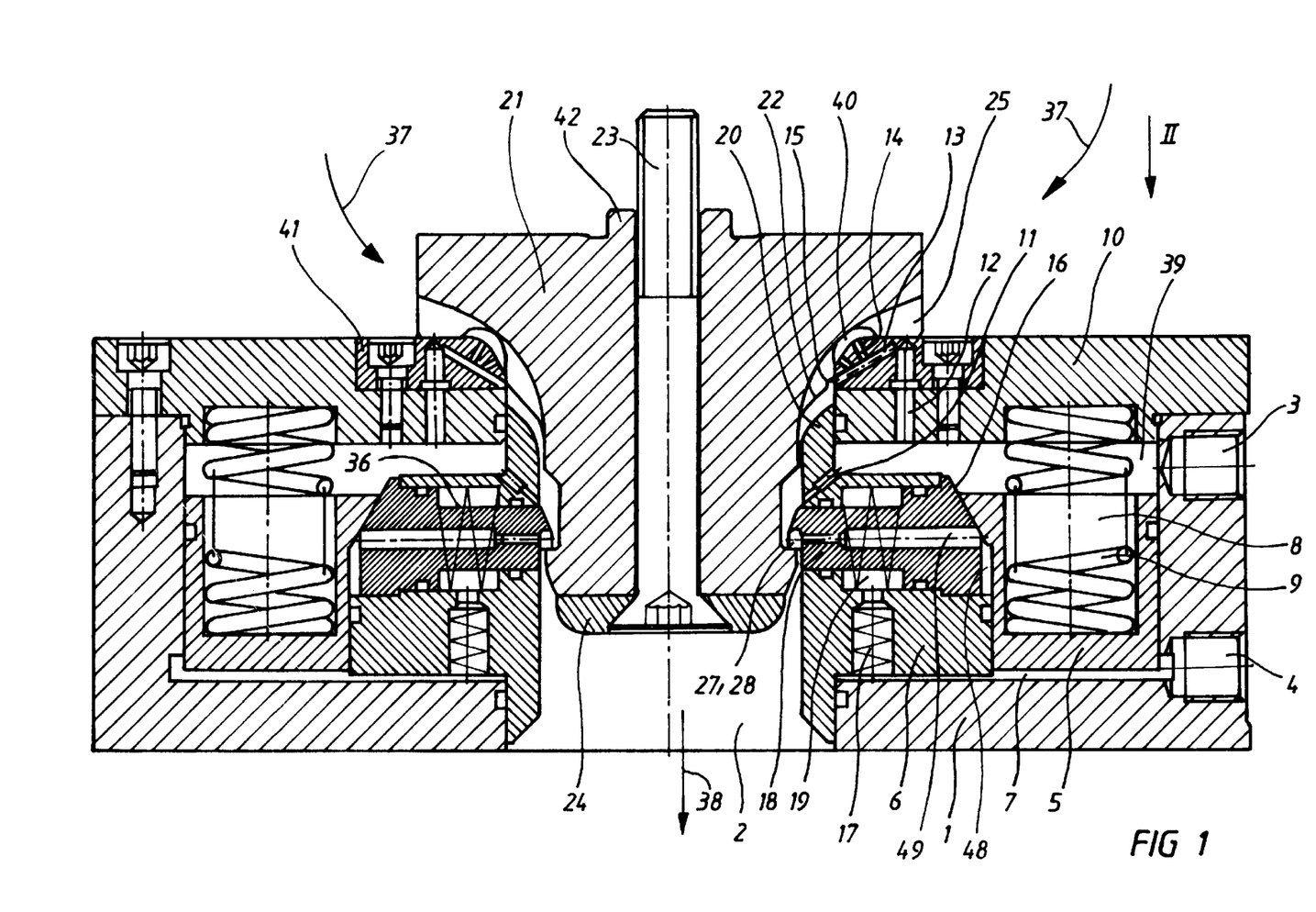
FIG. 1 shows a sectional view of a clamping system in accordance with the present invention.
Figure 2:
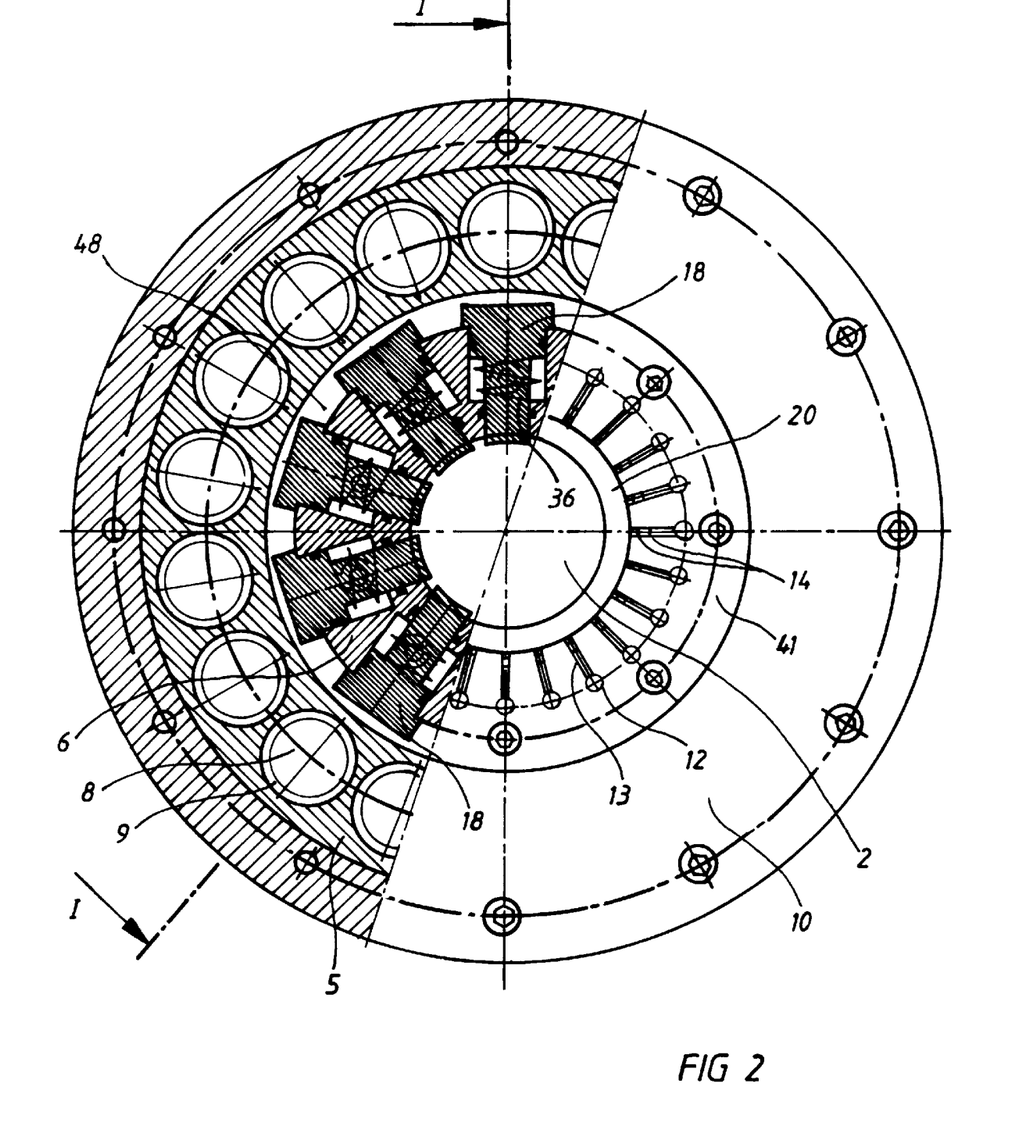
FIG. 2 shows a plan view of the clamping cylinder with part of the cover being removed.

AS shown in FIGS. 1 and 2, a clamping cylinder 1 is provided with a central bore 2. A pull-in nipple 21 is arranged centrally inside said bore 2. As shown, the nipple 21 is in ist locked end position, the locking means being a special piston cylinder arrangement described in detail below.

The cylinder 1 comprises a cup-shaped housing including lateral annular flanges being provided with inlets 3, 4 for air and oil. The housing is covered by a cover part 10.

Via the lower inlet 4 oil may be introduced in a pressure chamber 7 arranged between an upper surface of the clamping cylinder 1 and a lower surface of an outer piston 5. The outer piston 5 is sealingly guided inside the clamping cylinder 1 and axially moveable. Movement of the piston 5 in an upward direction is achieved by introducing oil in the pressure chamber, while movement in a downward direction is effected by one or several springs 9 inserted in associated bores 8 in the outer piston 5. Certainly, these helical springs 9 may be replaced by a cup spring, the bores them being replaced by a circumferential groove.

Arranged radially inward the outer piston 5 is an inner piston 6 which is axially moveable as well. The pressure chamber 7 extends under said piston 6 and is connected to a second pressure chamber 19 being formed between the outer piston 6 and a locking piston 18. Said locking piston 18 is coupled to the outer piston 5 by means of an inclined surface 16. From FIG. 2 it is clear that there are several locking pistons 18 distributed over the circumference of inner piston 6. All these locking pistons 18 operate as set forth above. The pressure chambers 19 are connected to each other by the pressure chamber 7 so that a uniform pressure is achieved.

All pistons 5, 6 and 18 are axially moveable, the locking pistons 18 additionally being radially moveable. Piston 5 is biased downward by springs 8, piston 6 is biased upward by springs 17 and pistons 18 radially outward by springs 36.

As soon as piston 5 is moving downward, caused by the springs 9, the inclined surface 16 urges locking pistons 18 radially inward, the locking pistons 18 being at the same time being moved downward, too. This results in a simultaneous movement of piston 6 downward. To achieve movement in the opposite direction, oil is introduced via inlet 4 and enters pressure chambers 7 and 19. Piston 5 is moved upwards, pistons 6 and 18 are urged by springs 17 and 36 upwards and radially inwards, respectively. This movement is encouraged by oil pressure.

On its radial inner end, each locking piston 18 is provided with an abutment surface 27. As set forth above, this abutment surface 27 is moved radially and axially at the same time. A nipple 21 as shown in FIG. 1 inserted in the central bore 2 is gripped, the abutment surfaces 27 engaging an associated circumferential flange 26 on the nipple 21, the nipple 21 being pulled inside the bore 2 in direction 38 and being locked in the position shown. The abutment surfaces 27 are at the same time configured as knives 28.

In order to release the nipple 21 the pistons 5, 6 and 18 are moved as set forth above. To ensure proper release of the nipple 21, piston 6 is provide with a release part 20 extending axially upward. A similar part extends downward; both parts are provided with suitable seals such as O-rings to seal the inside of the clamping cylinder 1 with respect to the bore 2.

Figure 3:
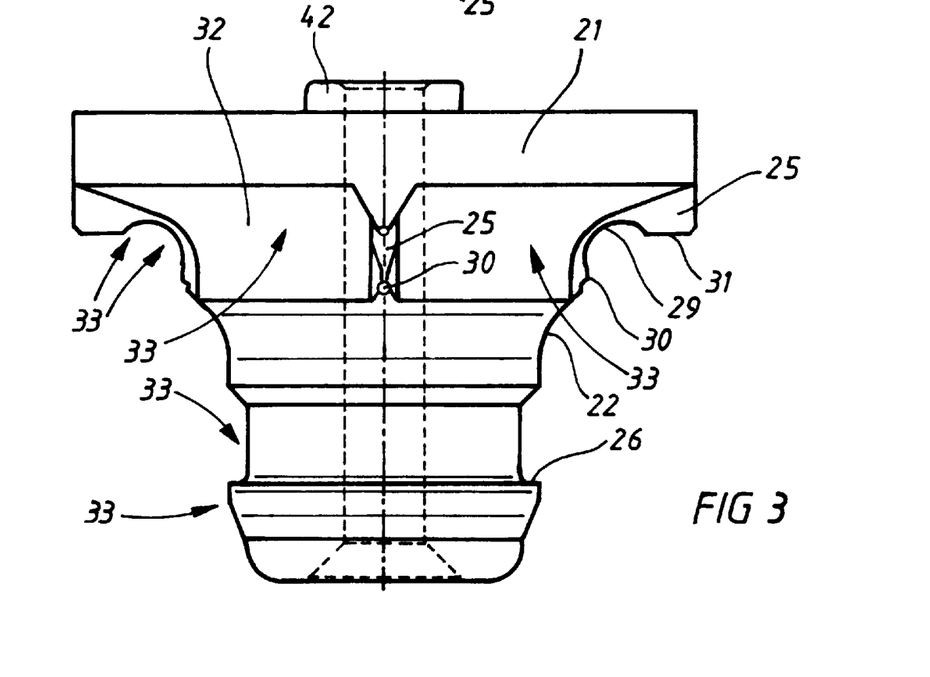
FIG. 3 shows a side view of a nipple in accordance with the present invention.
Figure 4:
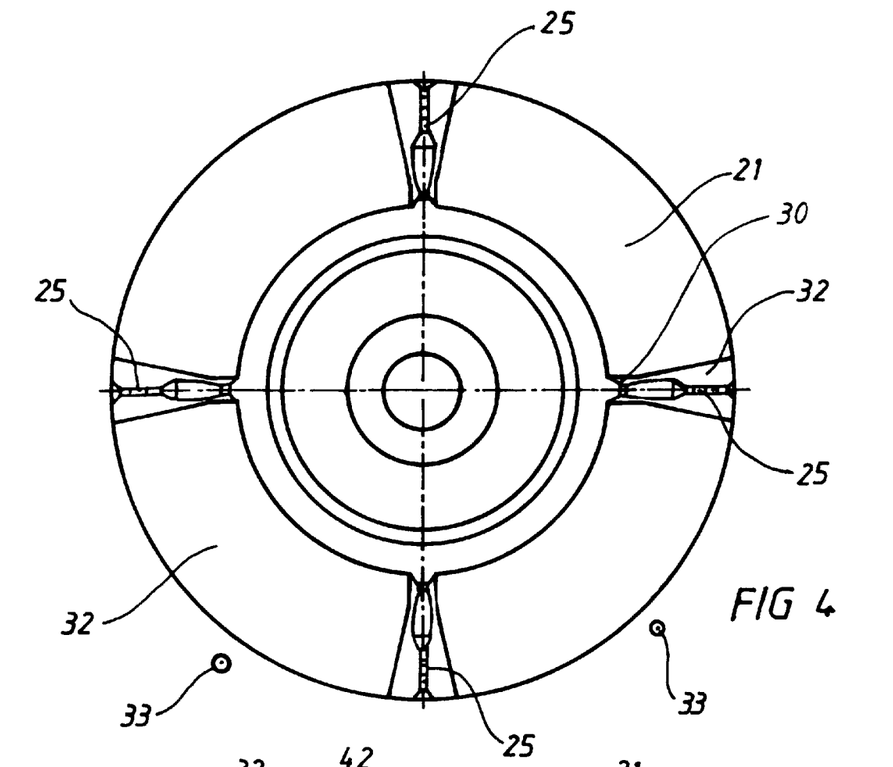
FIG. 4 shows a bottom view of the nipple of FIG. 3.

The nipple 21 as shown in FIGS. 3 and 4 is provided with four centering surfaces 30 designed to engage associated contact surfaces in the central bore 2 of clamping cylinder 1. These centering surfaces 30 ensure proper radial arrangement of nipple 21 with respect to the clamping cylinder 1. It should be observed that nipple 21 is axially symmetrical.

Figure 5:
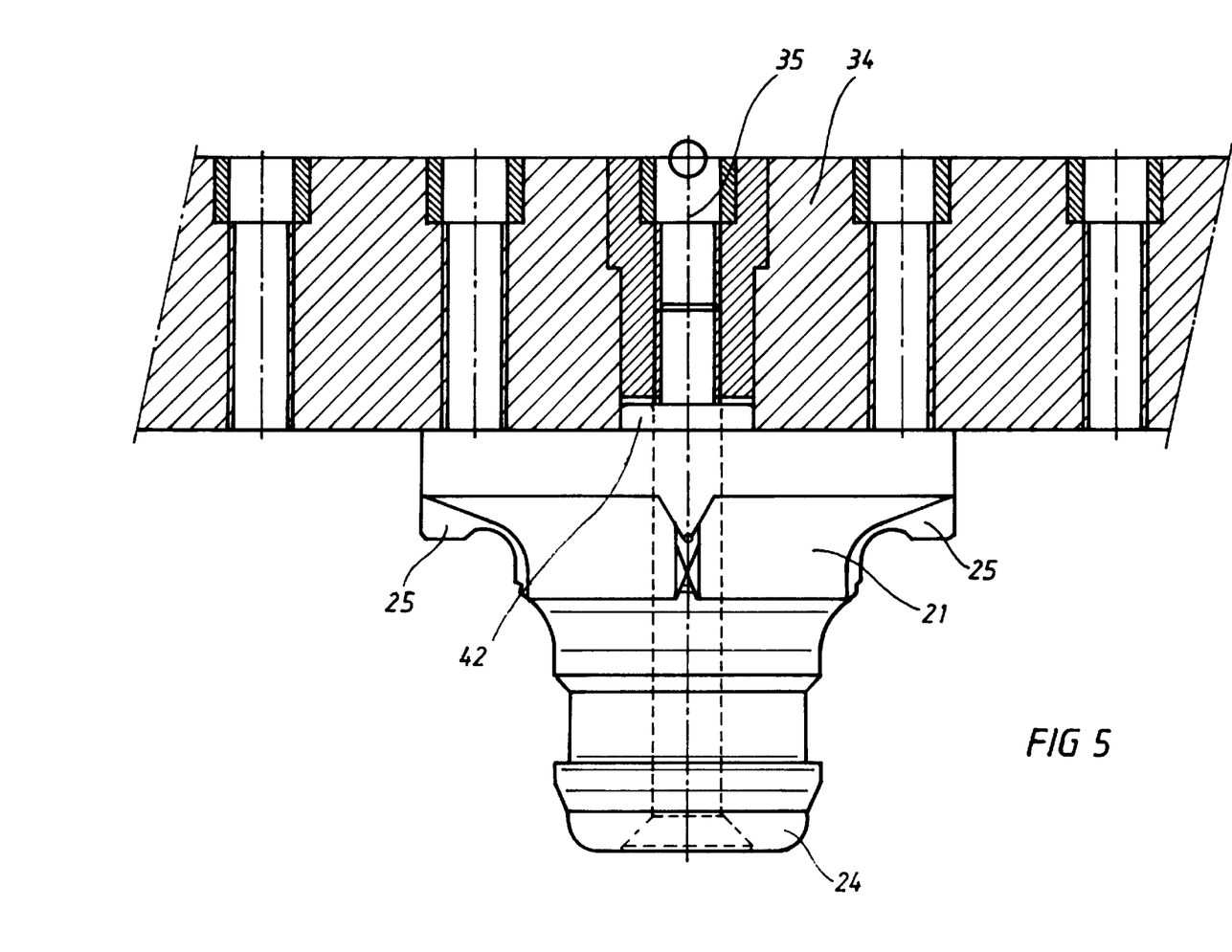
FIG. 5 shows a second embodemient of a nipple attached to a pallet.

In order to center the nipple 21 with respect to a pallet 34 (see FIG. 5), the nipple 21 is provided with a lug 42 engaging a bore in pallet 34. The nipple 21 is rigidly attached by a screw 23 extending through nipple 21. The nipple 21 is shown provided with a plate 24 to minimize or eliminate any spreading forces. The plate 24 at the same time serves to protect the clamping cylinder 1 as it is made of softer material.

Arrangement of the nipple 21 with respect to the cylinder 1 ist highly precise, a reference axis 35 is defined and obtained corresponding to the common central axes of cylinder 1 and nipple 21. Said axis 35 may be used for further processing.

DESCRIPTION OF THE CHIP CUTTING ACTION

Apart from the features described above, the nipple 21 shown in FIGS. 3 and 4 is provided with a cutting means 25. The cutting means is essentially provided on the circumference of nipple 21 in form of several radially extending cutting edges. Between these cutting edges 25 there are formed free spaces enabling introduction of air, oil, cutting and cooling agent in central bore 2.

A second cutting means on nipple 21 is provided on the centering surfaces 30. These are provided with a sharp cutting edge on the lower edge.

A third cutting means is present in form of the knives 28 provided on the locking pistons 18.

In case any cips are present in the region of one of the cutting means, these chips are cut away and removed. Accordingly, the nipple 21 can be properly received and locked even in case of chip contamination.

In the locked position, the abutment surfaces 31 of cutting means 25 rest on an air dispenser 41 of cover 10. The air dispenser, which function will be described more in detail below, is arranged to be easily replaceable. It is not shown that a nipple with a far bigger diameter can be used. In this case, a part to be easily replaced is provided in the respective region of cover 10.

Radially inward the abutment surfaces 31 the nipple 21 is provided with an opening 29 which serves to accomodate cut chips. Thus, the nipple 21 can be brought in its locked end position without being stopped by chip build-up between the nipple and the cover 10. The opening 29 defines a dirt-free space 40 being provided with nozzles 14, 15 to blow away any chip or other dirt.

DESCRIPTION OF THE ADDITIONAL CLEANING

Usually, it will not be required to refer to the cutting means all the time. In most cases, chips and/or dirt may be removed prior to insertion of nipple 21 with air or oil being supplied at a certain pressure. The clamping cylinder 1 is provided with a respective cleaning system.

The upper inlet 5 allows entry of air or another cleaning fluid in a chamber 39. This fluid is directed to nozzles by means of associated bores. A nozzle 11 parts from chamber 39 and leads to an annular groove, referred to as distribution channel 12. This channel 12 is connected to other channels 13, each being provided with nozzles 14, 15.

The nozzles 14, 15 end in the dirt-free space 40. Any dirt accumulating in this space 40 is removed by the cleaning fluid exiting from the nozzles 14, 15. Channel 13 is not arranged horizontally, but inclined to prevent entry of water or an other fluid, arriving in direction 37, from the central bore 2 via the nozzles 14, 15 in chamber 39. Any such water is redirected to the central bore 2 by channel 13.

As already stated, the air dispenser 41, on which the nozzles 14, 15 are provided is easy to replace.

Additional nozzles 11 being connected to chamber 39 and facing downward and radially inward are provided below the nozzles 14, 15. These nozzles 11 are directed to the locking pistons 18 which in turn are provided with knives 28. Accordingly, any chip cut by the locking pistons 18 can then reliable be removed by the cleaning fluid.

In total, the nipple 21 forms a circumferential flange 32 of conical form. The cleaning fluid is streaming around said flange 32 in direction 33 and removes any chips or dirt.

An additional cleaning can be performed directly through the locking pistons 18. As shown in FIGS. 1 and 2, there is provided a free space 48 between the locking pistons 18, extending not only radially, but also downward in a chamber between the locking piston 18 and the outer piston 5. A bore 49 is connected to said chamber and extends through each locking piston 18 to a nozzle.

DESCRIPTION OF A SECOND NIPPLE EMBODIMENT

Figure 6:
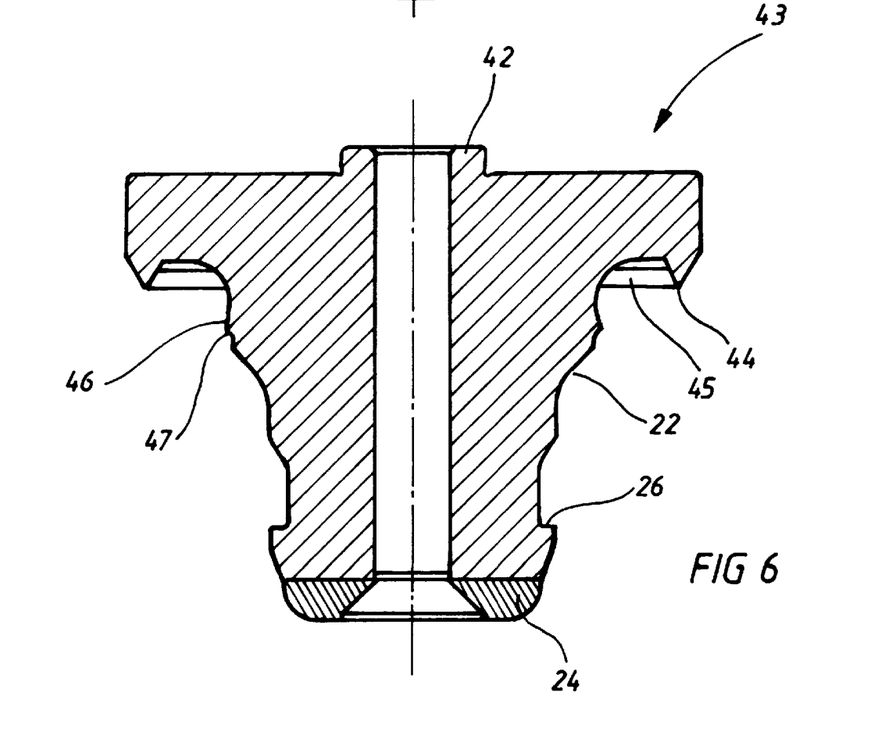
FIG. 6 shows a third embodiment of a nipple in sectional view.
Figure 7:
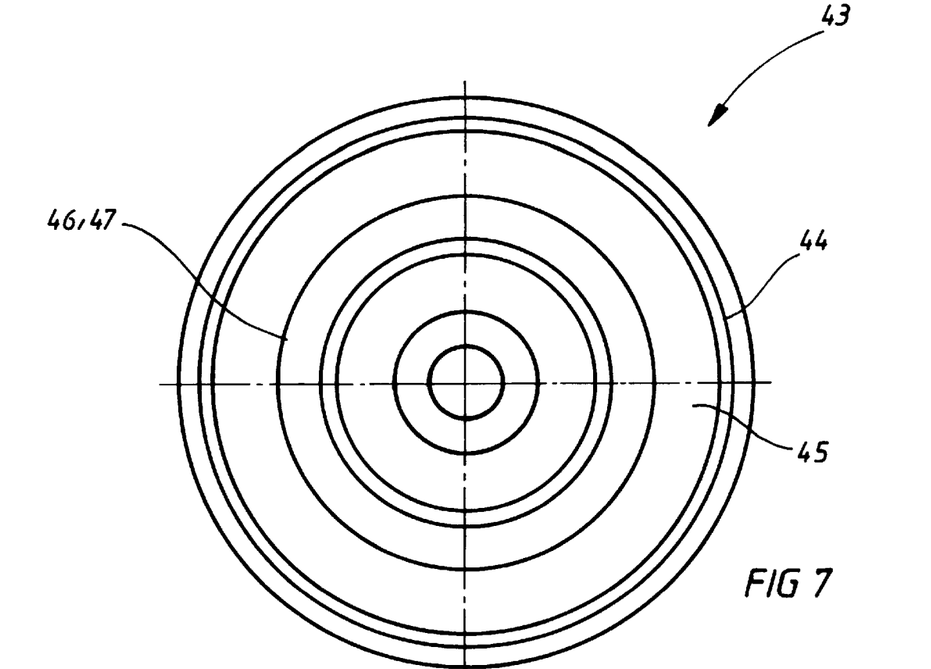
FIG. 7 shows a bottom view of the nipple of FIG. 6.

A second embodiment for a nipple 43 is shown in FIGS. 6 and 7. Identical or similar parts have been given the same reference numerals; a description of these parts is omitted. Please refer to the first embodiment for details. For sake of simplicity, the screw 23 ist not shown.

Nipple 43 includes a substantially circumferential cutting means in form of a cutting edge 44. This cutting edge 44 may cover the whole circumference or be provided in separate, arcuate parts. As in the first embodiment, a free space 45 is provided which serves to hold chips.

Centering is performed by means of an annular centering flange 46 covering the complete cercumference. The lower edge of flange 46 is configured as cutting edge 47, providing the second cutting means on the nipple 43. Function and working principle are identical to the nipple 21.

DETAILED DESCRIPTION OF THE LOCKING PISTONS

FIGS. 8 to 13 show three different embodiments of a locking piston 18a, 18b and 18c, respectively. Locking piston 18a is the one shown in connection with FIGS. 1 and 2. Each locking piston 18a, 18b, 18c is provided with a substantially cylindrical shaft 50. A bore 49 extends through the shaft 50 to provide free passage for the cleaning fluid.

Figure 8:
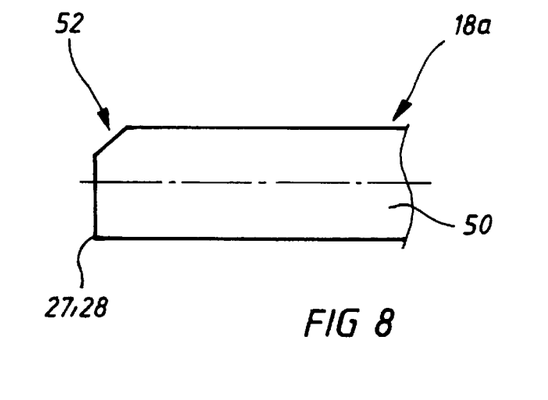
FIG. 8 is a side elevational view of a locking piston used in the cylinder in accordance with another embodiment of the invention.
Figure 9:
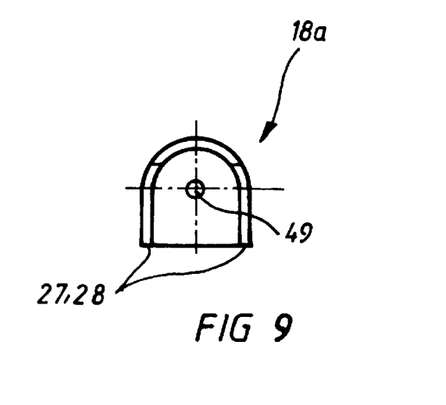
FIG. 9 is an end or front view of the locking piston shown in FIG. 8.

Locking piston 18a is provided with a trough 48 on the side facing the nipple 21 or 43, respectively. As such, the piston 18a is on that side provide with two arms, each being configured as abutment surface 27 and knive 28. The contact between this piston 18a and the flange 26 of the nipple 21 or 43 accordingly takes place covering a surface.

Figure 10:
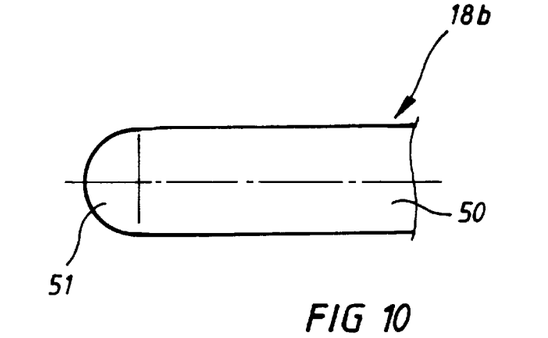
FIG. 10 is a side elevational view of still another embodiment of a locking piston used in the cylinder.
Figure 11:
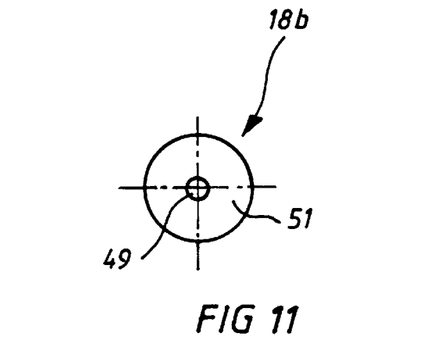
FIG. 11 is an end or front elevational view of the locking piston shown in FIG. 10.

Locking piston 18b is on that side provided with a ball head. An associated nipple (not shown) would accordingly be provided with a suitable arcuate contact surface having a corresponding curvature. Here, the contact occurs along a line.

Figure 12:
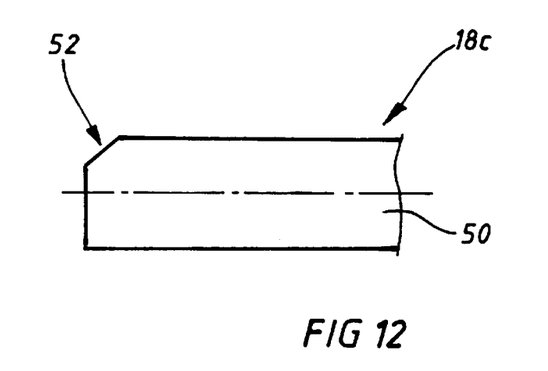
FIG. 12 is yet another embodiment of a locking piston in accordance with the invention used in the cylinder.
Figure 13:
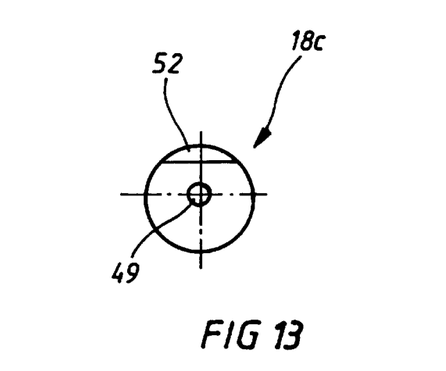
FIG. 13 is an end or front elevational view of the locking piston shown in FIG. 12.

Locking piston 18c is on that side cylindrical. On ist upper side, piston 18c may be provided with a chamfer 52, as well as piston 18a. Accordingly, the contact surface between piston 18c and flange 26 of nipple 21 or 43 is reduced to a point.

In total, the present invention provides a clamping system being far less sensitive to dirt and chips, which does not require manual cleaning and is able to operate under adverse conditions.

A variety of changes and modifications may be effected at the described embodiments without leaving the scope of the invention which is defined only by the attached claims.

What is claimed is:

1. A clamping cylinder adapted for repeated pulling-in and clamping of a pull-in nipple, said clamping being geometrically reproducible, the clamping cylinder being provided with a central bore extending through the clamping cylinder and a pull-in means for pulling in said nipple, wherein pulling-in of said nipple is effected by at least one locking piston provided with a cutting, member for physically removing debris on said nipple.

2. A clamping cylinder as defined in claim 1, wherein a plurality of locking pistons are provided each of which locking pistons is provided with cutting member for physically removing debris on said nipple.

3. A pull-in nipple for use with a clamping cylinder adapted for repeated pulling-in and clamping of a pull-in nipple, said clamping being geometrically reproducible, the clamping cylinder being provided with a central bore extending through the clamping cylinder and a pull-in means for pulling in said nipple, said pull-in nipple comprising a centering means and a flange adapted to be engaged by a pull-in means, said nipple being provided with at least one cutting member for physically removing debris on said nipple.

4. A clamping cylinder adapted for repeated pulling-in and clamping of a pull-in nipple, said clamping being geometrically reproducible, the clamping cylinder being provided with a central bore extending through the clamping cylinder and a pull-in means for pulling in said nipple, wherein pulling-in of said nipple is effected by a plurality of locking pistons, which locking pistons are provided with a cutting member for physically removing debris on said nipple, wherein the pulling-in of said nipple is effected by a plurality of locking pistons, arranged circumferentially around said bore.

5. The clamping cylinder of claim 4 wherein said locking pistons are actuated by a hydraulic fluid.

6. The clamping cylinder of claim 4 wherein said outer piston engages said locking pistons along an inclined surface.

7. A clamping cylinder adapted for repeated pulling-in and clamping of a pull-in nipple, said clamping being geometrically reproducible, the clamping cylinder being provided with a central bore extending through the clamping cylinder and a pull-in means for pulling in said nipple, wherein said cylinder is provided with springs acting on an outer piston in said cylinder to effect said pulling-in of said nipple.

8. The clamping cylinder of claim 7 wherein said outer piston is hydraulically actuated for movement against the biasing force of said springs.

9. The clamping cylinder of claim 7 wherein an inner piston is provided, arranged radially inward of said outer piston and surrounding said central bore.

10. The clamping cylinder of claim 9 wherein said inner piston is hydraulically actuated.

11. The pull-in nipple of claim 10 wherein said at least one cutting means is extending radially or circumferentially.

12. The pull-in nipple of claim 10 further comprising a lug to be centered in a bore.

13. The pull-in nipple of claim 10 further comprising a longitudinal bore extending over the complete length of said nipple to receive a screw for attaching the nipple to a separate part.

14. The pull-in nipple of claim 13, wherein said nipple is provided with a plate to receive the head of said screw.

15. The clamping cylinder of claim 7 wherein said outer piston engages said locking pistons along an inclined surface.

16. The clamping cylinder of claim 7 wherein said outer piston engages said locking pistons along an inclined surface.

* * * * *